D. McKENZIE & W. J. MORRISON.
HIGH AND LOW PRESSURE TESTING DEVICE.
APPLICATION FILED SEPT. 19, 1910.
982,520.
Patented Jan. 24, 1911.
2 SHEETS—SHEET 1.
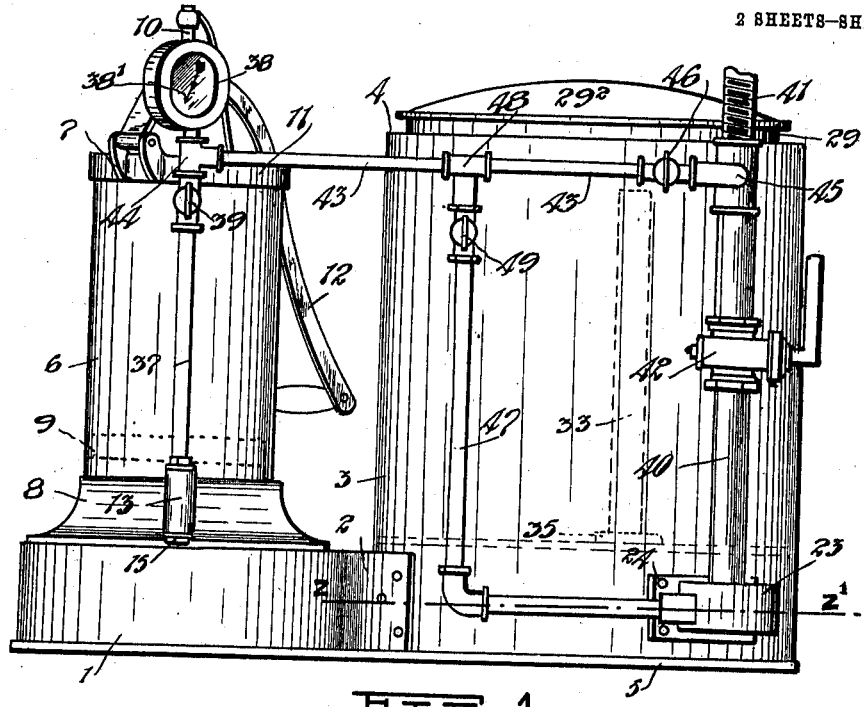

D. McKENZIE & W. J. MORRISON.
HIGH AND LOW PRESSURE TESTING DEVICE.
APPLICATION FILED SEPT. 19, 1910.
982,520.
Patented Jan. 24, 1911.
2 SHEETS—SHEET 2.
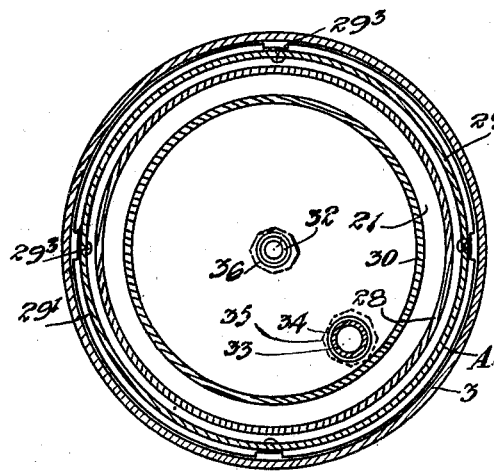
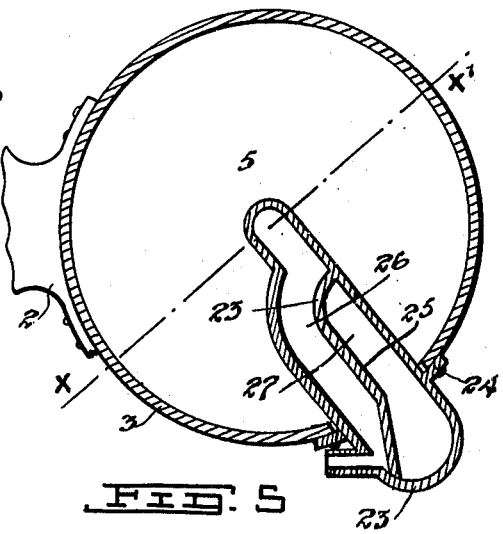
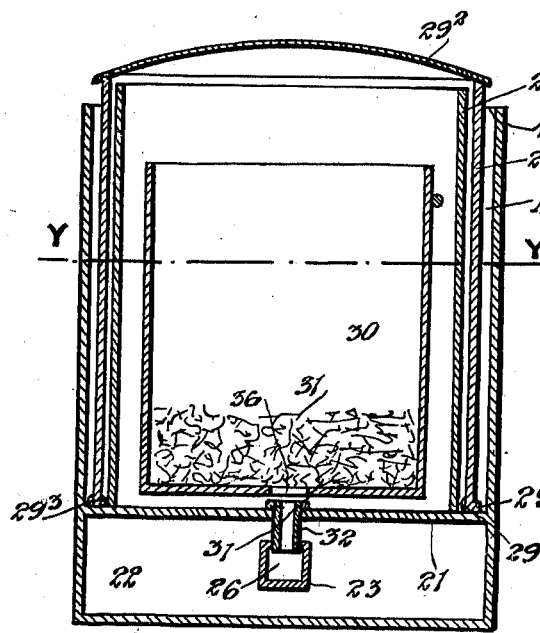
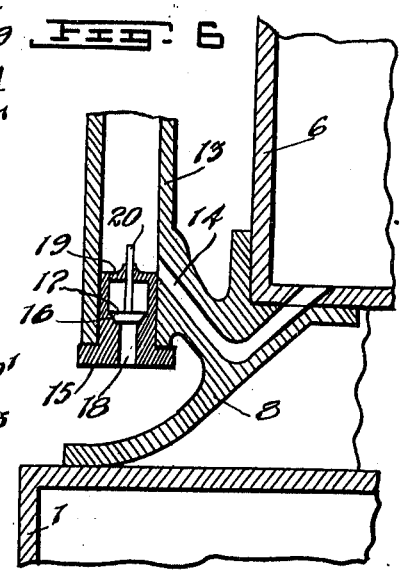

UNITED STATES PATENT OFFICE.

DUNCAN McKENZIE AND WILLIAM JARVIE MORRISON, OF WINNIPEG, MANITOBA, CANADA.

HIGH AND LOW PRESSURE TESTING DEVICE.

982,520.  Specification of Letters Patent.  Patented Jan. 24, 1911.

Application filed September 19, 1910.  Serial No. 582,791.

*To all whom it may concern:*

Be it known that we, DUNCAN MCKENZIE and WILLIAM JARVIE MORRISON, of the city of Winnipeg, in the Province of Manitoba, Canada, have invented certain new and useful Improvements in High and Low Pressure Testing Devices, of which the following is the specification.

Our invention relates to high and low pressure testing devices, particularly adapted for testing water pipes where such pipes are installed under fixed regulations called for by certain local bylaws as is customary in all our cities, towns and other large communities.

The object of the invention is to provide a simply constructed, easily operated efficient device whereby the joints formed between water pipes can be tested for leakage, such device being constructed so that the joints can be subjected to a high or a low pressure test as the case demands.

It consists essentially in the novel arrangement and construction of parts hereinafter more particularly described and pointed out in the appended claims.

Referring to the drawings in which like characters of reference indicate corresponding parts in each figure, Figure 1 is a side elevation of the complete device, the valves being shown in the position which they occupy when the low pressure test is being made. Fig. 2 is a plan view of the device. Fig. 3 is a vertical sectional view through the bell and adjoining parts, the section being taken in the plane denoted by the line X X', Fig. 5. Fig. 4 is a horizontal sectional view through the bell and the adjoining parts, the section being taken in the plane denoted by the line Y Y', Fig. 3. Fig. 5 is a horizontal sectional view through the bottom of the outside cylinder, the section being taken in the plane denoted by the line Z Z', Fig. 1. Fig. 6 is an enlarged detailed vertical sectional view through the pop valve chamber showing the duct leading to the inner cylinder.

1 represents a base piece in the form of a hollow casting having a saddle 2 formed on the side thereof, which saddle is firmly secured to the lower end of the outer cylinder 3 having an open upper end 4. The base piece and cylinder rest on a bottom support 5 which closes the lower ends of the base piece and the cylinder.

6 represents the cylinder of an air (force) pump 7, which cylinder is carried by a suitable foot piece 8 firmly secured to the base piece 1. The cylinder 6 contains the piston 9 which is connected to the piston rod 10 passing out to the head 11 of the cylinder. A pump handle 12 is connected to the rod so that the up and down swinging motion of the handle reciprocates the piston in the cylinder as is usual.

A detailed description of the pump parts is not given for the reason that they are already well known and form in themselves no part of our invention, the pump being simply used as a means for compressing air.

13 is a valve casing cast with the foot piece 8, which casing is supplied with a duct 14 leading from the valve chamber to the interior of the pump cylinder. A screw plug 15 passes into the lower end of the valve chamber and is supplied with a valve seat 16 and a pop valve 17 which controls the passage of air through the inlet port 18.

19 is a bridge formed on the plug and carrying a bearing for the valve stem 20.

The cylinder 4 is supplied with a cross partition 21 which incloses a cavity 22 in which we insert a casting 23 carrying a flange 24, which flange is securely riveted or otherwise fastened to the wall of the cylinder. The casting has a hollow interior which is divided by a partition 25 forming two passage ways 26 and 27 entirely independent one of the other.

28 is an inner cylinder permanently secured to the partition 21 and having its upper edge extending above the upper level of the cylinder 4. A cylindrical bell 29 having a flared-out open bottom 29' and a closed top at $29^2$ passes over the cylinder 28 into the annular chamber formed at A between the cylinders 28 and 4. The lower end of the bell rests normally on the partition. Knobs $29^3$ extend from the inner side of the bell and bear against the adjoining faces of the cylinder 28.

30 is a removable pail or pan contained within the cylinder 28. The pail is supplied with a material 31 such as waste which, when ignited, will give off a heavy smoke. A pipe 32 leads from the inner end of the passage way 26 to the interior of the cylinder 28. A pipe 33 also leads from the passage way 27 into the cylinder 28, which pipe extends well up within the cylinder and passes through a suitable opening 34 formed in the bottom of the pail 30. A collar 35 is placed on this latter pipe directly above the partition 21 and supports the pail clear of the partition. A circular opening 36 is also formed in the bottom of the pail directly above the upper end of the pipe 32.

37 is a pipe leading from the valve casing 13 directly to the pressure gage 38. A valve 39 is placed in this length of pipe and controls the passage of air through the same. An outlet pipe 40 passes from the outer end of the passage way 26 upwardly to the lead pipe 41, which latter pipe is of any length desired so that it can be suitably secured to the lengths of pipes to be tested. A valve 42 is also located in the pipe 40 controlling the passage of air through the same.

43 is a horizontal supply pipe connected to the pipes 37 and 40 by T elbows 44 and 45. A valve 46 is located in this pipe adjoining the elbow 45.

47 is a branch supply pipe communicating at its lower end with the passageway 26 and passing upwardly to the pipe 43 to which it is connected by a T elbow 48. A valve 49 is located in this pipe.

In order to better understand the invention we will now describe its operation assuming that it is desired to test the water pipe connections of an ordinary house which supply wash basins, bath tubs and other such like appliances, as required by local bylaws. The pipes and branch pipes including those leading to the basins, baths and other appliances are connected to the pipe 41 and a column of water is placed in the annular receptacle A hereinbefore referred to. In actual practice in this locality a column of water of one inch is placed in the receptacle A which forms a water seal for the bell. The valves are set as shown in the drawings and the pump handle is operated, the waste being first ignited so that it gives off a dense smoke which collects in the cylinder 28 and the bell. Air is drawn into the pump through the port 18 and is forced from the cylinder 6 through the duct 14, the pipes 37, 43 and 47 to the passage way 26 where it enters the bell. The pumping is continued until the inch water seal is broken which is detected immediately by the escape of smoke from the bell. Immediately this is noticed the valve 39 is closed. This means that the whole system, including the pipes being tested, is subjected to the pressure of an inch water column, as it will be understood the interior of the bell communicates through the pipe 33, passage 27, and pipes 40 and 41 with the pipes being tested. If any leakage takes place after the valve 39 is closed, it will be indicated by the bell dropping. The leak can immediately be located by watching for smoke escaping from the pipes. If the bell does not change its position one is satisfied that no leakage occurs. The test above described is termed the low pressure test. However the pipes are subjected to a high pressure test prior to the wash basins, bath tubs and other such appliances being connected. When this is to be done the valves 46 and 49 are closed, while the valve 42 is open. The smoke generated by the burning waste passes directly through the passage way 27 and the pipes 40 and 41 to the pipes being tested, which are accordingly filled with smoke. The stop cock 42 is then closed and valve 46 is opened so that direct communication is made with the pump through the pipes 37 and 43 with the pipe 41. The pump is operated, the valve 39 at this time being open, and air is compressed in the pipes being tested to whatever pressure is required by the local bylaws. This pressure is indicated by the gage and when it is reached the valve 39 is closed. Accordingly any leakage in the pipes being tested is immediately apparent by the movement of the gage hand. The leakage is found by looking for smoke escaping from the pipes.

What we claim as our invention is—

1. A pressure testing device comprising an inner and outer cylinder mounted on a common base having open tops, said cylinders forming there-between an annular water receptacle, a bell closing over the top of the inner cylinder and operating within the water receptacle, an air pump adjoining the cylinders, an outlet pipe communicating with the interior of the inner cylinder and passing to the exterior of the outer cylinder, a supply pipe passing between the air pump and the outlet pipe, a pressure gage inserted in the supply pipe, a valve interposed in the supply pipe between the gage and the pump, a valve located in the supply pipe adjoining the outlet pipe, a valve in the outlet pipe, a branch supply pipe passing from the former supply pipe and communicating with the interior of the inner cylinder and a valve in the latter pipe, as and for the purpose specified.

2. A pressure testing device comprising an inner and an outer cylinder mounted on a common base and having open tops, said cylinders forming an annular water receptacle between them, a casting adjoining the cylinders and provided with two distinct passages both of which open to the interior of the inner cylinder, an air pump adjoining the cylinder, an outlet pipe communicating with one of the said passages in the casting, a valve in the outlet pipe, a supply pipe passing from the pump and communicating with the outlet pipe, a pressure gage inserted in the supply pipe, a valve interposed in the supply pipe between the gage and the pump, a branch supply pipe passing from the former supply pipe to the other of the passages in the casting, a valve in the branch pipe, and a further valve located in the former supply pipe between the branch supply pipe and the outlet pipe, as and for the purpose specified.

3. A pressure testing device comprising a support, an outer cylinder mounted on the support and having an open top and closed bottom, a partition supplied in the outer cylinder toward the bottom thereof, an inner cylinder mounted on the partition having an open top, said inner and outer cylinders together with a partition forming a water receptacle, a bell closing over the top of the inner cylinder and operating within the water receptacle, a casting positioned immediately beneath the partition and provided with two distinct passage ways, a short pipe leading from one of the passage ways to the partition and opening to the bottom of the inner cylinder, a second pipe passing from the other passage and extending well within the inner cylinder, an outlet pipe communicating with the latter passage, a valve in the outlet pipe, an air pump adjoining the cylinders, a supply pipe passing from the air pump to the outlet pipe, a gage in the supply pipe, a valve located in the supply pipe between the gage and the air pump, a second valve in the supply pipe adjoining the outlet pipe, a branch supply pipe passing from the supply pipe to the former of the passage ways in the casting, and a valve located in the branch pipe, as and for the purpose specified.

4. A pressure testing device comprising a support, an outer cylinder mounted on the support and having an open upper end and closed bottom, a horizontally disposed partition in the cylinder, an inner cylinder located in the partition having an open top, said cylinders forming a water receptacle between them, a bell closing over the top of the inner cylinder and operating within the water chamber, a casting located beneath the partition and provided with two distinct passage ways, a short pipe leading from the bottom of one of the passage ways to the bottom of the inner cylinder, a second pipe leading from the other of the passages to the top of the inner cylinder, an outlet pipe communicating with the latter passage way, an air pump adjoining the cylinders, a supply pipe passing from the air pump to the outlet pipe, a pressure gage inserted in the supply pipe, a valve in the supply pipe between the gage and the pump, a valve in the outlet pipe between the supply pipe and the latter passage way, a branch pipe communicating with the supply pipe between the gage and the outlet pipe and communicating with the former of the passage ways, a valve in the branch pipe, a valve in the supply pipe between the branch pipe and the outlet pipe, and a pan insertible within the inner cylinder and provided with openings to accommodate the pipes therein, as and for the purpose specified.

Signed at Winnipeg in the Province of Manitoba, this 30th day of June, 1910.

DUNCAN McKENZIE.
WILLIAM JARVIE MORRISON.

In the presence of—
G. S. ROXBOURGH,
J. K. ELKIN.